(12) United States Patent
Falatok

(10) Patent No.: US 7,086,432 B1
(45) Date of Patent: Aug. 8, 2006

(54) FLEX COUPLING FOR GRINDERS AND CHIPPERS

(75) Inventor: Daniel R. Falatok, Moore, SC (US)

(73) Assignee: BB&F, LLC, Spartanburg, SC (US)

( * ) Notice: Subject to any disclaimer, the term of this patent is extended or adjusted under 35 U.S.C. 154(b) by 0 days.

(21) Appl. No.: 11/111,424

(22) Filed: Apr. 21, 2005

(51) Int. Cl.
A01G 23/06 (2006.01)
B27M 3/00 (2006.01)

(52) U.S. Cl. .............. 144/24.12; 144/334; 37/302

(58) Field of Classification Search ............ 144/24.12, 144/337, 375, 2.1, 3.1, 334, 335, 373; 83/928; 241/101.3, 32; 37/352, 302, 903; 464/32; 192/56.5; 403/2
See application file for complete search history.

(56) References Cited

U.S. PATENT DOCUMENTS

| | | | |
|---|---|---|---|
| 3,342,155 A * | 9/1967 | Hook | 114/280 |
| 3,405,541 A * | 10/1968 | Whitfield et al. | 464/33 |
| 4,086,012 A * | 4/1978 | Buckley et al. | 403/2 |
| 4,180,107 A * | 12/1979 | Grover | 144/24.12 |
| 4,204,589 A * | 5/1980 | Loker et al. | 192/27 |
| 5,109,895 A * | 5/1992 | Rassier | 144/24.12 |
| 5,419,380 A * | 5/1995 | Bot | 144/334 |
| 5,660,217 A | 8/1997 | Nissley | |
| 5,794,673 A | 8/1998 | Milbourn et al. | |
| 6,003,570 A | 12/1999 | Falatok et al. | |
| D433,428 S | 11/2000 | Pullen | |
| 6,263,930 B1 | 7/2001 | Wiley | |
| 6,305,445 B1 * | 10/2001 | Falatok | 144/24.12 |
| 6,435,234 B1 * | 8/2002 | Paumier | 144/24.12 |
| 6,438,874 B1 * | 8/2002 | LaBounty et al. | 37/403 |
| 6,546,977 B1 | 4/2003 | Monyak et al. | |
| 6,640,851 B1 * | 11/2003 | Bennington | 144/24.12 |
| 6,708,743 B1 | 3/2004 | Ziehm | |
| 6,751,895 B1 | 6/2004 | Paumier | |
| 6,848,485 B1 | 2/2005 | Paumier et al. | |

* cited by examiner

Primary Examiner—Bena Miller
(74) Attorney, Agent, or Firm—Dority & Manning, P.A.

(57) ABSTRACT

A cutting machine and a method of using the cutting machine includes a cutting apparatus having a cutting device, a jackshaft sheave, an endless belt and an engine sheave. The cutting machine may have a jackshaft sheave, which is rotatably connected to the cutting instrument with the endless belt disposed about the jackshaft and engine sheaves. An engine includes a flywheel with an interface, which are configured for powering the cutting apparatus. A shaft assembly transfers energy from the flywheel of the engine to the engine sheave. The shaft assembly includes a shaft plate, a stub shaft and a coupling plate. The shaft plate is connected to the coupling plate and defines a shaft aperture with the stub shaft disposed in the shaft aperture. The stub shaft depends from the shaft aperture and is rotatably connected to the engine sheave. The coupling plate includes a coupling rotatably connected to the interface. The coupling defines a coupling chamber in which another end of the stub shaft depends and is connected in the coupling chamber such that a rotation of the coupling rotates the stub shaft to rotate the endless belt about the jackshaft and engine sheaves to operate the cutting apparatus.

19 Claims, 5 Drawing Sheets

FLEX COUPLING FOR GRINDERS AND CHIPPERS

FIELD OF THE INVENTION

This invention relates to cutting machines, particularly stump grinders and wood chippers.

BACKGROUND OF THE INVENTION

Stump grinding machines are used widely for removing tree stumps using a grinding wheel, a cutting chain or other cutting instrument. The grinding wheel, for instance, is swept back and forth across a tree stump. With each sweep, the grinding wheel is lowered incrementally until the stump is removed. The final sweeps of the grinding wheel may be below ground level to ensure that the entire stump has been eliminated.

Power to drive the grinding wheel is derived from an engine, usually a gasoline or diesel engine, installed on the grinding machine. The conventional grinding machine uses a power train that directly connects the engine to the grinding wheel to transfer the engine power to the grinding wheel. If the grinding wheel becomes jammed below ground level, for instance, while removing the tree stump, an overtorque situation can occur. Such a situation can transfer shear and overload forces to the engine, particularly its crankshaft, which can result in an engine failure that is costly to repair or may require replacement of the engine.

BRIEF SUMMARY OF THE INVENTION

The present invention is directed in general to a cutting machine, which includes a drive assembly that connects an engine to a cutting apparatus. The drive assembly acts an operational interface or flexible coupling between the engine and the cutting apparatus to prevent damage to the engine if the cutting apparatus becomes overloaded. The component parts of the invention are simple and economical to manufacture, assemble and use, and other advantages of the invention will be apparent from the following description and the attached drawings, or can be learned through practice of the invention.

According to an aspect of the invention, a cutting machine includes a cutting apparatus for cutting a workpiece and an engine for powering the cutting apparatus. The workpiece can be a material such as wood, leaves, grasses and combinations of these materials. The cutting apparatus can chip, shred, grind or mulch the material.

In this aspect of the invention, a shaft assembly is provided to transfer energy from the engine to the cutting apparatus. The shaft assembly includes a shaft plate, a stub shaft and a coupling plate. The shaft plate is connected to the engine, and the coupling plate is positioned between the engine and the shaft plate. The shaft plate defines a shaft aperture through which the stub shaft extends. The stub shaft has a first end and an opposing second end defining a longitudinal axis. The first end extends from the shaft aperture and is connected to the cutting apparatus. Also in this aspect, the first end of the stub shaft defines at least one channel disposed parallel to the longitudinal axis. The coupling plate includes a coupling connected to the engine. The coupling plate includes a coupling chamber in which the second end of the stub shaft is connected such that a rotation of the coupling rotates the stub shaft to operate the cutting apparatus.

The cutting machine in this aspect of the invention further includes an engine sheave and a bushing. The engine sheave defines at least one annular race thereon for respective engagement with the endless belt. Additionally, the engine sheave defines a bushing aperture in which the bushing is located. A key extends from the bushing into the channel of the stub shaft to couple the engine sheave and the stub shaft together.

The cutting machine can include a jackshaft sheave defining at least one complementary annular race thereon for respective engagement with the endless belt, which is engaged with the annular race of the engine sheave noted above. The jackshaft sheave is rotatably connected to the cutting apparatus such that the rotation of the coupling rotates the stub shaft to rotate the engine and jackshaft sheaves to operate the cutting apparatus.

Also in this aspect of the invention, the second end of the stub shaft defines an outer surface having a plurality of splines depending radially therefrom. The splines are disposed parallel to the longitudinal axis of the stub shaft. The coupling chamber of the coupling defines an inner surface having a plurality of complementary splines depending inwardly therefrom and disposed parallel to the longitudinal axis, each of the complementary splines further disposed adjacent respective ones of the plurality of splines when the second end of the stub shaft is inserted in the coupling chamber of the coupling.

Further in this aspect of the invention, the flywheel is rotatably engaged with the coupling, and the splines and the complementary splines, which are engaged in the coupling chamber, are formed to fail prior to failure of an engine crankshaft of the engine. Additionally, the cutting machine in this aspect also includes a plurality of grommets, which are located about the coupling. The grommets are also formed to fail with or before the splines prior to failure of the engine crankshaft of the engine.

The cutting machine in this aspect of the invention can also include means for maneuvering the cutting machine, such as a locomotion apparatus selected from a wheel, an endless track and combinations of such devices. The means for maneuvering can further include a control system.

The cutting machine can include at least one lubrication or grease fitting in liquid communication with the shaft assembly. A first grease fitting, for instance, can be in liquid communication with the stub shaft to communicate a quantity of grease between the splines of the stub shaft and the coupling chamber to relieve friction when the stub shaft rotates. A second grease fitting, for instance, can be in liquid communication with the stub shaft to communicate a quantity of grease to a plurality of bearings located around the stub shaft in a housing chamber through which the stub shaft at least partially extends.

In another aspect of the invention, a shaft assembly for transferring energy from a power plant of a cutting machine to a cutting apparatus of the cutting machine is provided. In this aspect, the shaft assembly includes a shaft housing with a chamber therein, a stub shaft rotatably disposed in the chamber; and a coupling plate connected to the shaft housing. The coupling plate has a coupling with a coupling chamber therein. The stub shaft has a first end and an opposing second end defining a longitudinal axis. The first end extends from the chamber and is rotatably connected to the cutting apparatus. The second end extends from the chamber and is connected in the coupling chamber such that a rotation of the coupling rotates the stub shaft to operate the cutting apparatus. In this aspect, the flywheel is rotatably engaged with the coupling, and the stub shaft will fail before failure of a crankshaft in the engine.

This aspect of the invention also includes a plurality of bearings. Moreover, the shaft housing defines an inner race therein, and the bearings are rotationally disposed in the inner race and about an exterior surface of the stub shaft. The bearings rotate about the exterior surface of the stub shaft relative to the chamber. The shaft assembly in this aspect also includes at least one lubrication fitting in liquid communication with the shaft assembly to lubricate components in the chambers discussed above.

In yet another aspect of the invention, a cutting machine includes a cutting apparatus with a cutting device, an endless belt and an engine sheave. If the cutting machine is a stump grinder, it can also include a jackshaft sheave. The jackshaft sheave is rotatably connected to the cutting instrument with the endless belt disposed about the jackshaft and engine sheaves. Also included in this aspect is an engine with a flywheel having an interface for powering the cutting apparatus.

Additionally in this aspect of the invention, a shaft assembly is provided for transferring energy from the flywheel of the engine to the engine sheave. The shaft assembly includes a shaft plate, a stub shaft and a coupling plate. The shaft plate is connected to the coupling plate and defines a shaft aperture therethrough. The stub shaft in this aspect is located in the shaft aperture and has a first end with an opposing second end defining a longitudinal axis. The first end extends from the shaft aperture and is rotatably connected to the engine sheave. The coupling plate includes a coupling rotatably connected to the interface. The coupling has a coupling chamber therein, and the second end of the stub shaft extends from the shaft aperture and is connected in the coupling chamber such that a rotation of the coupling rotates the stub shaft to rotate the endless belt about the jackshaft and engine sheaves to operate the cutting apparatus.

The second end of the stub shaft in this aspect of the invention defines an outer surface having a plurality of splines depending radially therefrom. The splines are disposed parallel to the longitudinal axis. The coupling chamber of the coupling has an inner surface with a plurality of complementary splines depending inwardly therefrom. The complementary splines are disposed parallel to the longitudinal axis, each of the complementary splines further disposed adjacent respective ones of the plurality of splines when the second end of the stub shaft is inserted in the coupling chamber of the coupling. In this aspect, the stub shaft, when engaged in the coupling chamber, is designed to fail prior to failure of a crankshaft of the engine. Similarly, the coupling engaged with the stub shaft will fail if necessary prior to failure of crankshaft of the engine. Moreover, a plurality of bushings disposed about the coupling engaged with the stub shaft will fail prior to failure of the stub shaft and the crankshaft, flywheel or other engine components.

BRIEF DESCRIPTION OF THE DRAWINGS

Further aspects and advantages of the invention will be apparent from the following description, or can be learned through practice of the invention, in combination with the drawings, which serve to explain the principles of the invention but by no means are intended to be exhaustive of all of possible manifestations of the invention. At least one embodiment of the invention is shown in the drawings in which.

DETAILED DESCRIPTION OF THE INVENTION

Figure 1:
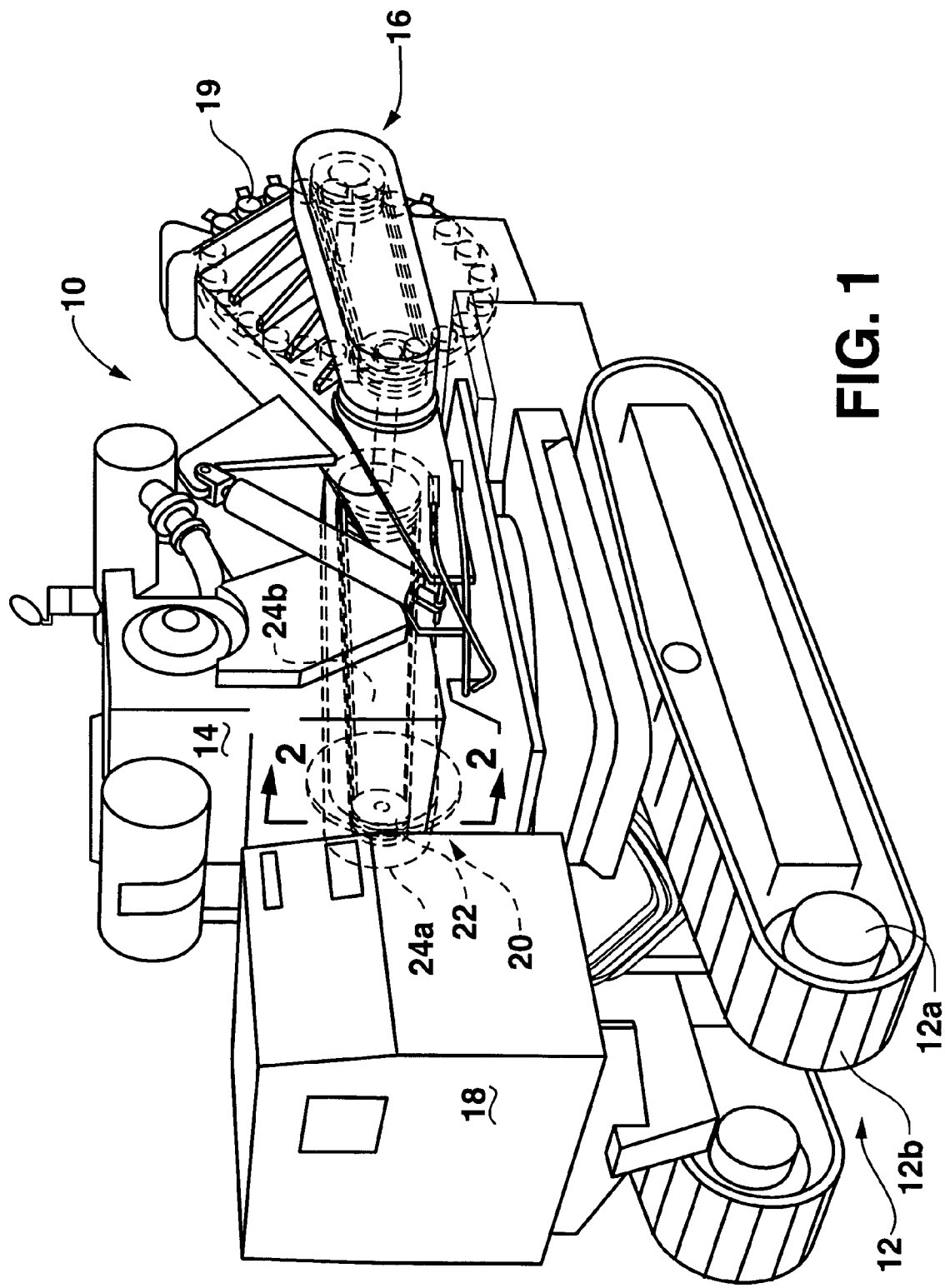
FIG. 1 is a perspective side view of an embodiment of the present invention installed in an environment in which the invention is intended to be employed.

Detailed reference will now be made to the drawings in which examples embodying the present invention are shown. The detailed description uses numerical and letter designations to refer to features of the drawings. Like or similar designations of the drawings and description have been used to refer to like or similar parts of the invention.

The drawings and detailed description provide a full and written description of the invention, and of the manner and process of making and using it, so as to enable one skilled in the pertinent art to make and use it, as well as the best mode of carrying out the invention. However, the examples set forth in the drawings and detailed description are provided by way of explanation only and are not meant as limitations of the invention. The present invention thus includes any modifications and variations of the following examples as come within the scope of the appended claims and their equivalents.

The figures broadly embody a cutting machine, designated in general by the element number 10. The cutting machine 10 generally includes a locomotion apparatus 12 for moving and maneuvering the cutting machine 10, a power plant such as a gas or diesel engine 14, and a cutting apparatus 16 such as a stump grinder or brush cutter to clear stumps, brush, and the like from an area of land. These and other components and characteristics of the cutting machine 10 are described in greater detail and by way of exemplary operation below.

With particular reference to FIG. 1, the engine 14 of the cutting machine 10 provides power to the locomotion apparatus 12 to drive the cutting machine 10. As shown in this example, the locomotion apparatus 12 is a tracked system, which includes a plurality of wheels 12a and an endless tread or track 12b for rotation about the wheels 12a to maneuver the cutting machine 10 in various directions. Also shown, a control system 18 is provided to govern power transfer from the engine 14 to the cutting apparatus 16 such as by increasing rotation speed of components within a drive assembly 20, as described below.

According to the embodiment shown in FIG. 1, the cutting apparatus 16 is a stump grinder system, which includes a cutting device 19 for grinding and removing stumps. It will be appreciated that the cutting apparatus 16 is not limited to this exemplary stump removal arrangement. The skilled artisan will instantly appreciate that the cutting apparatus 16 can also be a brush cutter or a chipper. Therefore, as used herein, the phrase "cutting apparatus" is used to mean brush cutter, brush chipper, stump grinder and the like. It will be further appreciated that the cutting device 19 can utilize a cutting or grinding wheel, a chainsaw, a plurality of cutting teeth or similar cutting arrangements.

FIG. 1 further introduces a stub shaft assembly 22, which is shown in phantom under a protective belt guard or cover 24a. A portion of the stub shaft assembly 22 projects through an inner guard or wall 24b of the drive assembly 20 from the engine 14 that, as will be described in further detail below, operably connects the engine 14 and the cutting apparatus 16. In general, the stub shaft assembly 22 provides a failsafe mechanism to prevent damage to the engine 14, more particularly, to an engine crankshaft 61 (see FIG. 5), should the cutting device 19 become wedged on a workpiece such as a tree stump. In other words, the stub shaft assembly 22 and its components as described in detail below are designed to fail at a predetermined shear modulus before an over-torque situation leads to failure of components of the engine 14.

Figure 2:
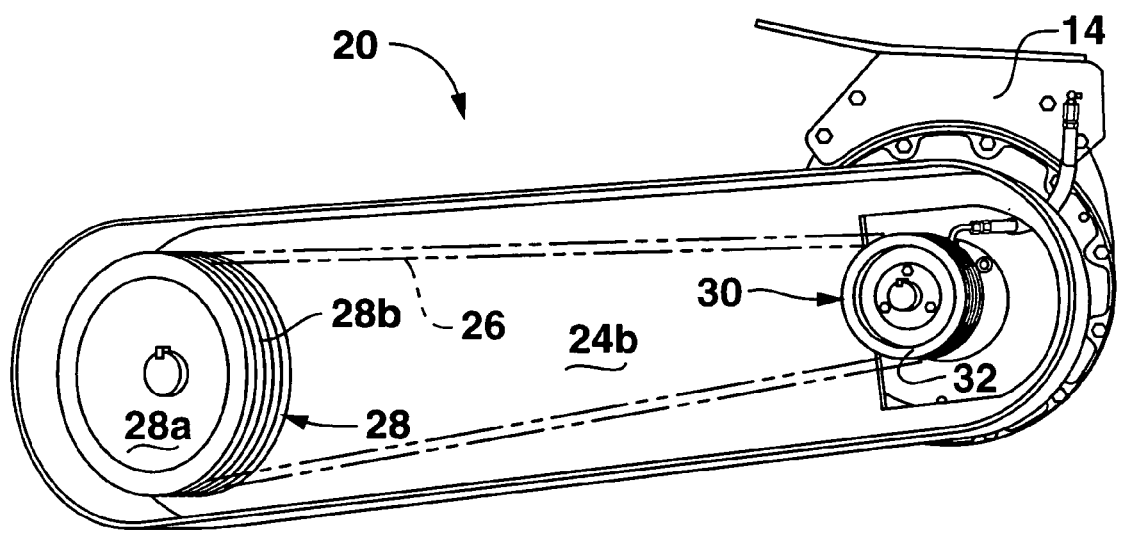
FIG. 2 is a front elevational view of a portion of a drive assembly taken along lines 2—2 in FIG. 1.

With reference to FIGS. 1 and 2, the inner wall 24b, one or more endless belts 26 such as V-belts, a jackshaft sheave assembly 28, and an engine sheave assembly 30 are shown clearly with the belt guard 24a removed. As shown, the jackshaft sheave assembly 28 is connected to the cutting device 19. The skilled artisan will instantly appreciate that a jackshaft may not be necessary in some direct drive cutting machines such as a chipper and is provided here only by way of example.

The jackshaft sheave assembly 28 includes a jackshaft sheave 28a with a plurality of annular races 28b (alternatively, run or groove) formed about the jackshaft sheave 28a. The belts 26 rotate about the annular races 28b of the jackshaft sheave 28a in concert with an engine sheave 32 of an engine sheave assembly 30.

Figure 3:
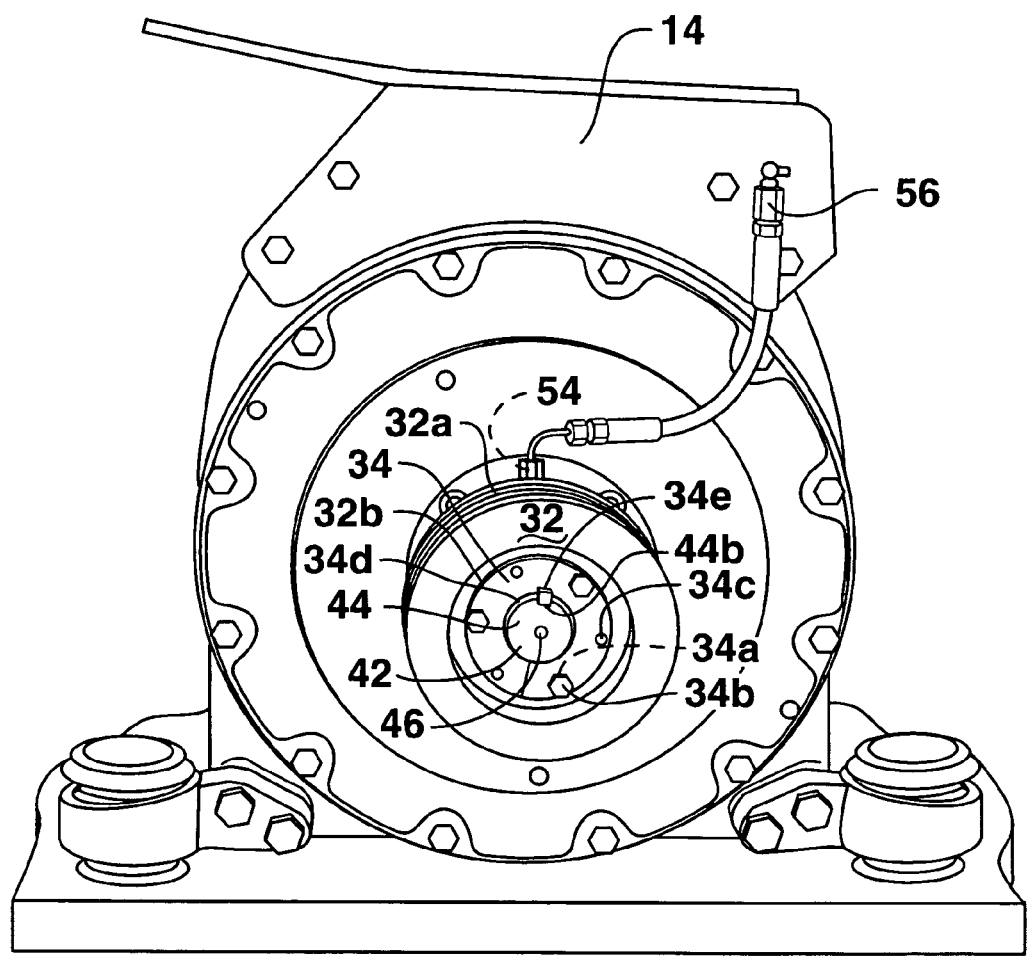
FIG. 3 is a detailed view of a portion of the drive assembly as in FIG. 2 with various components removed for clarity.

More particularly, with reference now to FIG. 3, the engine sheave 32 includes a plurality of outer complementary annular races 32a formed about the engine sheave 32. The engine sheave assembly 30 is connected to the engine 14 to receive power from the engine 14 as noted above. As the engine 14 powers the engine sheave 32, the belts 26 rotate about the complementary annular races 32a of the engine sheave 32, which also rotate about the annular races 28b of the jackshaft sheave 28a to power the cutting device 19, also noted above. One skilled in the art will instantly recognize that a variety of endless belts, lines or chains made of metal, rubber or hardened plastic materials can be used for the belts 26 and further details are not necessary to appreciate and practice this aspect of the invention.

FIG. 3 further shows a bushing 34 in the engine sheave assembly 30. As shown, the bushing 34 is located in a bushing aperture 32b of the engine sheave 32. The bushing 34 includes a plurality of first holes 34a and a plurality of complementary bolts 34b to mount the engine sheave 32 and the bushing 34 together. A plurality of second holes 34c (alternatively, "push-off" or removal holes) is also provided in the bushing 34 to store respective bolts 34b temporarily when the engine sheave assembly 30 is being disassembled for maintenance.

FIG. 3 also shows an inner shaft aperture 34d in the bushing 34 for receipt of a stub shaft 42. A key 34e projects from the bushing 34 into a channel 44b of the stub shaft 42 in this example to mate the bushing 34 and the stub shaft 42 together. The skilled artisan will instantly recognize that the key 34e and the channel 44b can be reversed on the bushing 34 and the stub shaft 42, or additional keys and channels can be utilized to mate the bushing 34 and the stub shaft 42 together. Moreover, various combinations of keys and channels on each of the bushing 34 and the stub shaft 42 can be employed to ensure that the bushing 34 and the stub shaft 42 are aligned and secured together.

As further shown in FIG. 3, a first grease fitting 46 and a second grease fitting 54 are provided to lubricate various components of the stub shaft assembly 22. As shown, the first grease fitting 46 extends from a first end 44 of the stub shaft 42 for insertion of grease or other suitable lubricant to lubricate a plurality of splines 50 within the stub shaft assembly 22 (see FIG. 4B). Similarly, the second grease fitting 54 is for insertion of grease or other suitable lubricant to lubricate a plurality of bearings 57 in the stub shaft assembly 22 (see FIG. 4B). Moreover, the second grease fitting 54 includes a grease fitting extension 56 for convenient access to the grease fitting 54 when the drive assembly 20 is assembled with the belt guard 24a in place as shown in FIG. 1. Those skilled in the art will appreciate and understand operation of the grease fittings 46,54 without requiring additional details of this aspect of the invention.

Figure 4A:
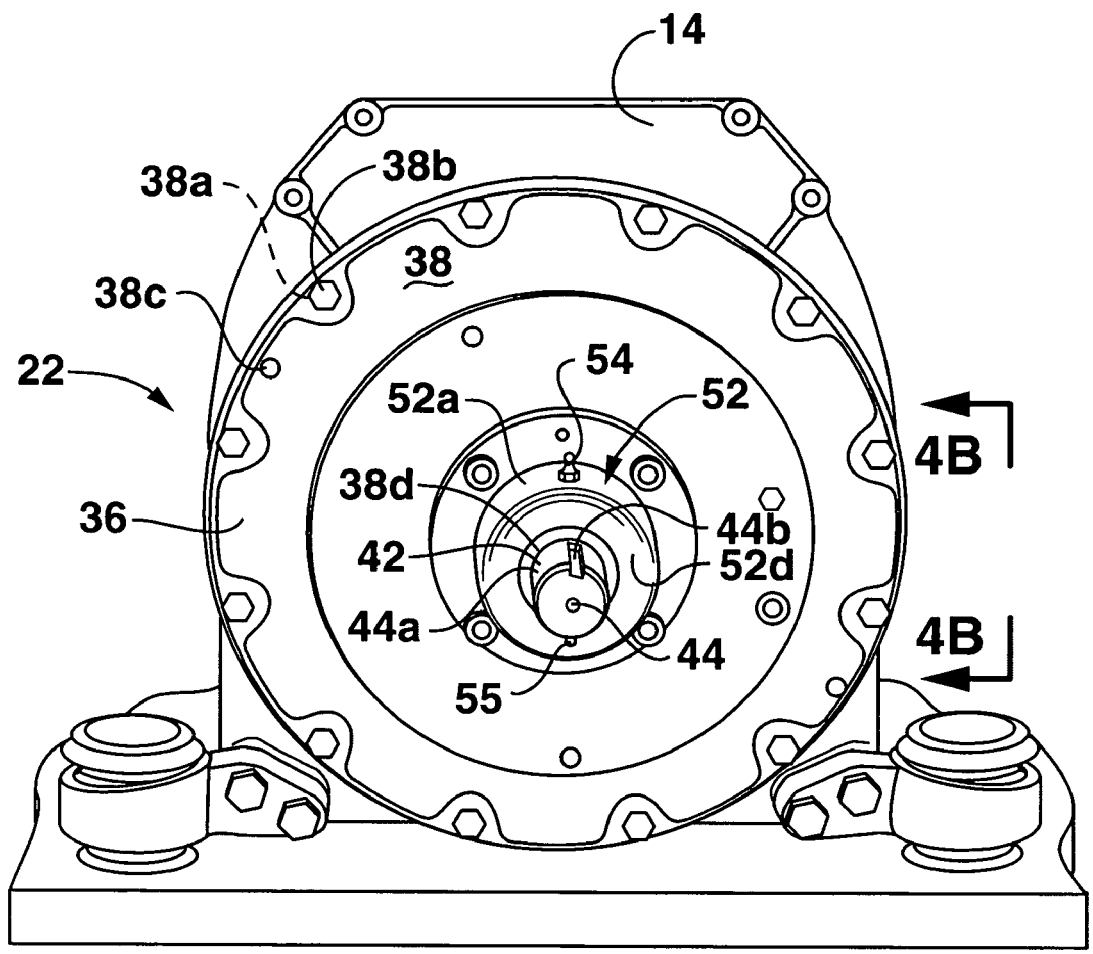
FIG. 4A is a front elevational view a detailed view of the portion of the drive assembly as in FIG. 3 with an engine sheave removed for further clarity.
Figure 4B:
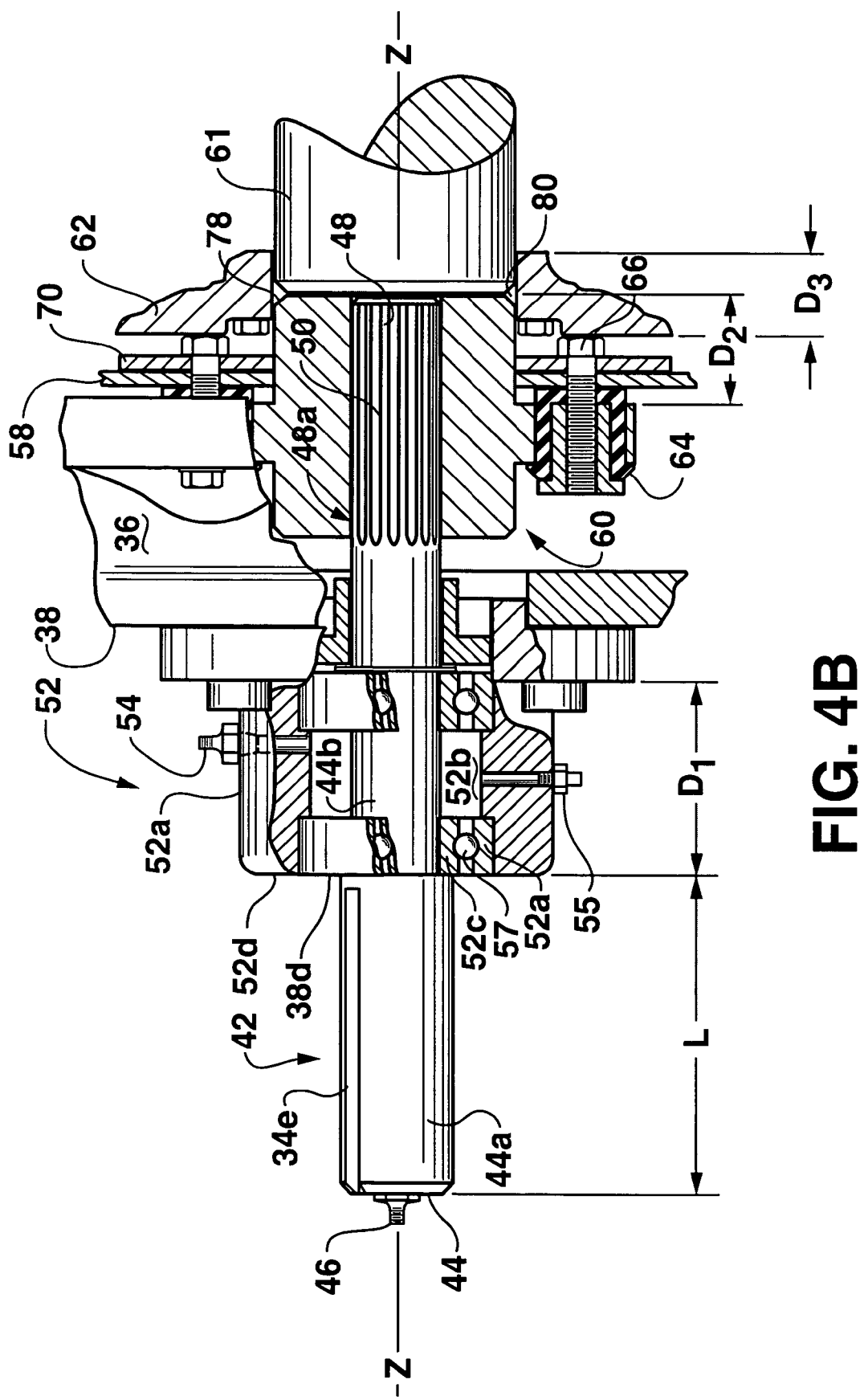
FIG. 4B is a partial cross section of a shaft assembly taken along lines 4B—4B in FIG. 4A.

Turning now to FIGS. 4A and 4B, the stub shaft plate assembly 22 is most clearly shown with the engine sheave assembly 30 and the grease fitting extension 56 removed. As shown, the stub shaft assembly 22 includes a shaft plate 36 with an external face 38 defining a number of attachment holes 38a and a complementary number of attachment bolts 38b. The shaft plate 36 is attached to the engine 14 via the attachment holes 38a and the attachment bolts 38b (see also FIG. 5). A plurality of service ("push-off" or removal holes) holes 38c are also shown defined about the shaft plate 36 for use with one or more of the attachment bolts 38b when the shaft plate 36 is being disassembled for service or repair. In use, some of the attachment bolts 38b are removed from their attachment holes 38a and inserted in the service holes 38c to temporarily hold a weight of the shaft plate 36 as the shaft assembly 22 is being disassembled. The skilled artisan will instantly appreciate that any attachment device or mechanism other than bolts can be used to attach the shaft plate 36 to the engine 14. For instance, screws, cotter keys and the like may be used in lieu of or in addition to the bolts 38b.

As further shown in FIGS. 4A and 4B, the stub shaft 42 has a first distal end 44 defining a circumferential exterior surface 44a in which the channel 44b introduced above is formed. As shown, the stub shaft 42 extends from a shaft aperture 38d of a shaft housing 52. The housing 52 defines an outer annular surface 52a and a shoulder 52d. The second grease fitting 54 is located on the outer annular surface 52a of the shaft housing 52 to lubricate the bearings 57 as noted above.

With more particular reference to FIG. 4B, the stub shaft 42 defines a longitudinal axis Z extending through the shaft plate 36 and from the shaft housing 52. The shoulder 52d of the shaft housing 52 is spaced apart from the external face 38 of the shaft plate 36, which defines a predetermined depth $D_1$ of the shoulder 52d relative to the shaft plate 36. The depth $D_1$ of the shoulder 52d and a predetermined length L of the stub shaft 42 position the engine sheave 32 at a desired distance from the external face 38 of the shaft plate 36 in order to accommodate components such as the grease fitting 54 and the grease fitting extension 56.

Also shown in FIG. 4B, the exemplary shaft housing 52 includes a fixed run 52a, an inner chamber 52b, and a race 52c. The bearings 57 rotate between the fixed run 52a and the race 52c within the inner chamber 52b as a middle exterior surface 44b of the stub shaft 42 rotates. As noted above, the second grease fitting 54 provides grease (not shown) to lubricate the bearings 57 as they rotate in the fixed run 52a and the race 52c. Those skilled in the art will understand that this arrangement of the fixed run 52a, the race 52c and the ball-shaped bearings 57 are provided by way of example only and any suitable race-bearing arrangement including tapered roller bearings can be used in lieu of or in addition to those shown and described.

FIG. 4B further shows a second end 48 of the stub shaft 42, which defines a circumferential outer surface 48a having a plurality of splines 50 radially extending from the outer surface 48a. As shown, the splines 50 extend parallel to the longitudinal axis Z of the stub shaft 42 and are inserted into a coupling 60 positioned within the coupling plate 58.

Figure 5:
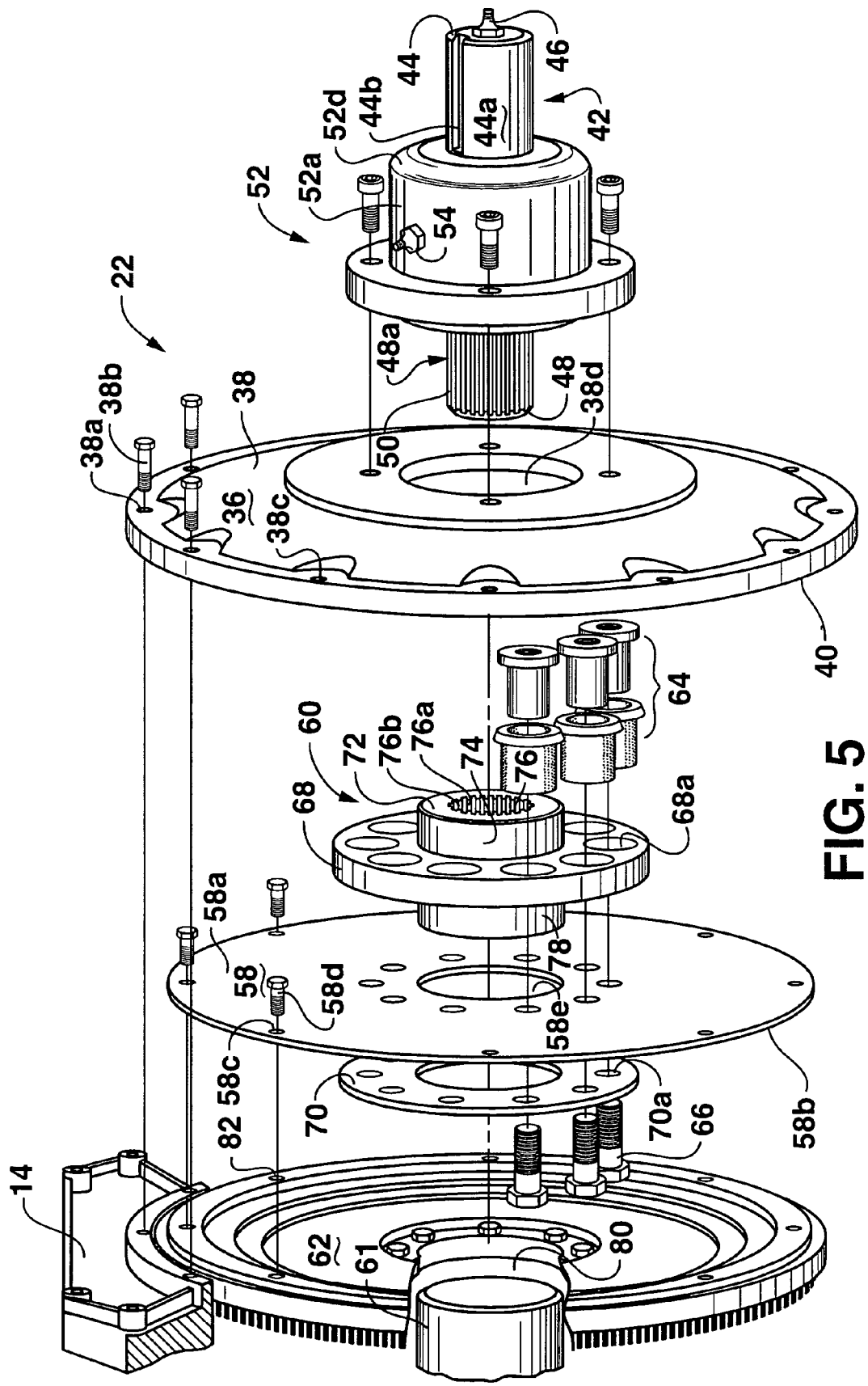
FIG. 5 is an exploded perspective view of the shaft assembly as in FIG. 4B in relation to other components of the present invention.

More particularly, with reference to FIGS. 4B and 5, the stub shaft assembly 22, the coupling plate 58, the coupling 60, and an engine flywheel 62 are shown respectively assembled and in a comparative exploded relationship. As shown, the shaft plate 36 of the stub shaft assembly 22 has an internal face 40 opposing its external face 38. In this example, the internal face 40 is depressed or cupped inward such that the shaft plate 36 exhibits a concave shape for receiving the coupling 60.

Also shown in FIGS. 4B and 5, the coupling plate 58 includes a first cutter side 58a and an opposing second flywheel side 58b. The coupling plate 58 further includes a plurality of coupling holes 58c with respective coupling bolts 58d to attach the coupling plate 58 to the engine flywheel 62. As noted above, any suitable attachment device or mechanism in lieu of or in addition to bolts can be used by the skilled artisan to couple the coupling plate 58 to the engine flywheel 62.

FIG. 5 most clearly shows a coupling aperture 58e through which the coupling 60 is inserted. A plurality of grommets or rubber bushings 64 is disposed about the coupling 60 and through the coupling plate 58 to provide absorb shock. A first reinforcement collar 68 according to this aspect of the invention is interposed between the grommets 64 and the coupling plate 58 to reinforce the area of the coupling plate 58 about the coupling 60. As shown, the grommets 64 extend through the coupling plate 58 and the first reinforcement collar 68 continuing through the second flywheel side 58b as well as a second reinforcement collar 70 in this aspect of the invention. A plurality of complementary bolts 66 secure the grommets 64 to the various components.

As further shown in FIG. 5, the coupling 60 includes a shaft end 72 defining an annular surface 74 that when assembled with the shaft plate 36 is located within the internal face 40 of the shaft plate 36. Also defined in the shaft end 72 of the coupling 60 is a coupling chamber 76, which includes an inner annular surface 76a with a plurality of teeth or complementary splines 76b. The complementary splines 76b are complementary to the splines 50 introduced above to achieve a sliding fit as shown in FIG. 4B.

FIGS. 4B and 5 further show a pilot end 78 of the coupling 60, which extends from the second reinforcement collar 70 at a depth $D_2$. The depth $D_2$ is sufficiently deep to extend past the bolts 66 in order for second end 48 of the stub shaft 42 to interact with the engine crankshaft 61. More particularly, the engine flywheel 62 is arranged in the engine 14, and the engine crankshaft 61 extends from the engine 14 for connection to the engine flywheel 62 in a known manner.

The engine flywheel 62 as shown in FIGS. 4B and 5 includes a plate-flywheel interface 80 having a predefined depth $D_3$ that is complementary to the depth $D_2$ of pilot end 78 of the coupling 60. As shown, the coupling plate 58 is attached to the flywheel 62 via the coupling bolts 58d and coupling plate attachment holes 82 in the flywheel 62. Due to the interaction of the pilot end 78 with the plate-flywheel interface 80, any shear or torquing forces are transmitted through the pilot end 78 of the coupling 60 rather than the coupling plate 58, which as shown in this example is a thin metal plate to reduce weight and manufacturing costs and to ease assembly.

As best shown in FIG. 5, the rubber grommets 64 extend through the coupling plate 58 in a manner that should one or more of the rubber grommets 64 fail, the stub shaft assembly 22 will generate noise and vibration indicating to a user that repair is needed. Should the noise and vibration of the failed grommets 64 go unheeded, the coupling plate 58 will fail due to a predetermined shear modulus of its thin metal construction. Finally, the splines 50 and/or the complementary splines 76b of the coupling 60 will fail before damage occurs to the engine crankshaft 61 or other internal engine components (not shown). In other words, one or more of the above components external to the engine 14 will fail before the engine crankshaft 61 reaches its failure limit. Thus, costly damage to components of the engine 14 is avoided according to this exemplary aspect of the invention.

The invention may be better understood with reference the figures and to an operation and servicing of the cutting machine 10.

Should the bearing supported stub shaft assembly 22 fail or require routine servicing, or if failure is suspected due to excessive noise and vibration during operation of the cutting machine 10, the engine 14 and the control system 18 are powered off and secured to prevent inadvertent operation of the cutting system 16 and it cutting device 19. Preferably, a battery supply (not shown) is also be disconnected from the engine 14. Also, preferably, all components are allowed to cool prior to servicing to avoid burning the user.

According to a method of the invention, the stub shaft assembly 22 can be serviced by first removing the belt guard 24a as shown in FIG. 1. Next, the belts 26 (if more than one) are removed from the jackshaft sheave 28a and the engine sheave 32 (see FIG. 2). The engine sheave assembly 30 is disassembled by removing the engine sheave 32 from the bushing 34. The bushing 34 is removed from the belt drive assembly 20 by removing the bolts 34b from their respective holes 34a as shown in FIG. 2. Preferably, the bolts 34b are removed and temporarily stored in the holes 34c in the bushing 34 to avoid losing the bolts 34b during servicing. More particularly, the bolts 34b are screwed into the holes 34c to push the bushing 34 apart from the stub shaft assembly 22. The holes 34a, 34c and the bolts 34b have complementary helical threads that facilitate screwing the bolts 34b out of the holes 34a and into the holes 34c in a known manner. As shown in FIG. 2, the bushing 34 has a channel 34e that fits or slides over the key 44b of the stub shaft 42. Therefore, the bushing 34 is slid from the key 34e and away from the stub shaft 42 in a direction away from the belt drive assembly 20. Finally, the inner guard wall 24b is removed by removing bolts or the like.

With respect to FIG. 3, the grease fitting extension 56 is removed from the second grease fitting 54 located on the outer annular surface 52a of the shaft housing 52. The bearing supported stub shaft plate 36 is next removed. Specifically, the attachment bolts 38b are removed from the attachment holes 38a and at least one of the attachment bolts 38b attached in one of the service holes 38c. As shown for example in FIG. 4A, there are twelve 10 mm bolts to remove. Also in this example, at least two of the bolts 38b can be inserted into at least two of the services holes 38c and rotated to push the stub shaft plate 36 apart from the flywheel 62.

More specifically, the two bolts 38b are screwed into the service holes 38c until the shaft plate 36 breaks free from about the coupling plate 58. By leaving at least two of the attachment bolts 38b screwed at least slightly in the service holes 38c, the bolts 38b can assist in preventing the shaft plate 36 from dropping when separated from the engine 14. When ready to remove the shaft plate 36, the bolts 38b can be completely removed from the service holes 38c while holding the first end 44 of the stub shaft 42 as shown in FIG. 5 and sliding the shaft plate 36 away from the coupling plate 58.

With reference to FIGS. 4B and 5, the coupling plate 58 can be removed by loosening and removing its eight coupling bolts 58d in this example. Once the coupling bolts 58d have been removed from their respective coupling holes 58c, the coupling plate 58 can be removed from the flywheel 62. After all components have been removed as above and the flywheel 62 is exposed, the flywheel 62 can be cleaned with any suitable cleaning solvent and checked for burrs or other damage around the plate flywheel interface 80 as well as around its coupling plate attachment holes 82.

If burrs or other minor damage are discovered, very fine sandpaper can be used to remove such burrs. If the damage has occurred to the bushings 64 or to the coupling plate 58, then the grommets 64 can be removed by removing the holding bolts 66 and/or the entire coupling plate 58 can be replaced. If the damage is discovered too late, the stub shaft 42 may also have realized damage to the splines 50 and may require replacing. In one aspect of the invention, the stub shaft 42 may be made of a more brittle or fragile metal such as brass to allow the stub shaft 42 to fracture at a predetermined shear modulus prior to damage occurring to the engine 14 such as its crankshaft 61. If the damage is determined to be beyond repair, then non-engine parts of the invention can be replaced quickly and conveniently at relatively lower cost than those of the engine 14.

The steps described above are simply reversed to reassemble the component parts of the stub shaft assembly 22. It has been found that some type of locking fluid such as Loc Tight® 242 brand should be placed on the bolts and all bolts lightly tightened to reassemble the components. Specifically, all bolts should be torqued to about 35 ft.-lbs. Further, an anti-seize coupling lubricant can be inserted in the coupling chamber 76 of the coupling 60. Also, care should be taken to line up the splines 50 with the complementary splines 76b before sliding the stub shaft 42 into the coupling chamber 76 to prevent any damage to the splines 50,76b. Additionally, the grease fitting 54 should be placed substantially in the twelve o'clock position as shown in FIGS. 4A and 4B to ensure that the extension 56 can be reattached to the grease fitting 54. Before starting the engine 14, grease or other appropriate lubricant should be applied to the grease fittings 46,54 in a known manner. As shown in FIG. 4B, a grease relief fitting 55 is provided to release excess grease to prevent over-pressurizing the chamber 52b.

Although the invention has been described in such a way as to provide an enabling disclosure for one skilled in the art to make and use the invention, it should be understood that the descriptive examples of the invention are not intended to limit the present invention to use only as shown in the Figures. For instance, an outer perimeter of the shaft plate 36 can be square, rectangular, oblong and various other shapes other than the illustrated round shape. Likewise, specific shapes of other components can be altered to suit particular applications. Additionally, positions of certain components can be reversed or alternated, such the key 34e of the bushing 34 and the channel 44b of the stub shaft 42 as previously noted. It is intended to claim all such changes and modifications as fall within the scope of the appended claims and their equivalents. Thus, while exemplary embodiments of the invention have been shown and described, those skilled in the art will recognize that changes and modifications may be made to the foregoing examples without departing from the scope and spirit of the invention.

The invention claimed is:

1. A cutting machine comprising:
    a cutting apparatus configured for cutting a workpiece;
    an engine configured for powering the cutting apparatus; and
    a shaft assembly configured for transferring energy from the engine to the cutting apparatus, the shaft assembly including a shaft plate, a stub shaft and a coupling plate, the shaft plate connected to the engine, the coupling plate interposed between the engine and the shaft plate, the shaft plate defining a shaft aperture therethrough with the stub shaft disposed in the shaft aperture, the stub shaft having a first end and an opposing second end defining a longitudinal axis, the first end depending from the shaft aperture and rotatably connected to the cutting apparatus, the coupling plate including a coupling rotatably connected to the engine and defining a coupling chamber therein, the second end of the stub shaft depending from the shaft aperture and connected in the coupling chamber such that a rotation of the coupling rotates the stub shaft to operate the cutting apparatus.

2. The cutting machine as in claim 1, wherein the first end of the stub shaft defines at least one channel disposed parallel to the longitudinal axis.

3. The cutting machine as in claim 2, further comprising an engine sheave and a bushing, the engine sheave defining at least one annular race thereon for respective engagement with at least one endless belt, the engine sheave further defining a bushing aperture therein, the bushing disposed in the bushing aperture with a key depending from the bushing into the channel of the stub shaft to couple together the engine sheave and the stub shaft.

4. The cutting machine as in claim 3, further comprising a jackshaft sheave defining at least a complementary annular race thereon for respective engagement with the endless belt engaged with the annular race of the engine sheave, the jackshaft sheave rotatably connected to the cutting apparatus such that the rotation of the coupling rotates the stub shaft to rotate the engine and jackshaft sheaves to operate the cutting apparatus.

5. The cutting machine as in claim 1, wherein the second end of the stub shaft defines an outer surface having a plurality of splines depending radially therefrom and disposed parallel to the longitudinal axis, and wherein the coupling chamber of the coupling defines an inner surface having a plurality of complementary splines depending inwardly therefrom and disposed parallel to the longitudinal axis, each of the complementary splines further disposed adjacent respective ones of the plurality of splines when the second end of the stub shaft is inserted in the coupling chamber of the coupling.

6. The cutting machine as in claim 5, wherein the plurality of splines and the plurality of complementary splines engaged in the coupling chamber are configured to fail prior to failure of an engine crankshaft of the engine, the flywheel rotatably engaged with the coupling.

7. The cutting machine as in claim 5, further comprising a plurality of grommets disposed about the coupling, the grommets being configured to fail prior to failure of an engine crankshaft of the engine, the flywheel rotatably engaged with the coupling.

8. The cutting machine as in claim 1, further comprising means for maneuvering the cutting machine.

9. The cutting machine as in claim 8, wherein the means for maneuvering the cutting machine is a locomotion apparatus selected from the group consisting of a wheel, an endless track, and combinations thereof.

10. The cutting machine as in claim 8, wherein the means for maneuvering the cutting machine includes a control system.

11. The cutting machine as in claim 1, wherein the workpiece is made of a material selected from the group consisting of a wood, a plurality of leaves, a plurality of grasses and combinations thereof, and the cutting apparatus is further configured to chip, shred, grind or mulch the material.

12. The cutting machine as in claim 1, further comprising at least one grease fitting in liquid communication with the shaft assembly.

13. The cutting machine as in claim 12, wherein a first grease fitting is in liquid communication with the stub shaft, the first grease fitting configured to communicate a quantity of grease between a plurality of splines of the stub shaft and the coupling chamber to relieve friction when the stub shaft rotates.

14. The cutting machine as in claim 13, wherein a second grease fitting is in liquid communication with the stub shaft, the second grease fitting configured to communicate a quantity of grease to a plurality of bearings disposed about the stub shaft in a housing chamber disposed about the stub shaft.

15. A cutting machine, comprising:
a cutting apparatus including a cutting device, a jackshaft sheave, an endless belt and an engine sheave, the jackshaft sheave rotatably connected to the cutting instrument with the endless belt disposed about the jackshaft and engine sheaves;
an engine having a flywheel with an interface, the engine configured for powering the cutting apparatus; and
a shaft assembly configured for transferring energy from the flywheel of the engine to the engine sheave, the shaft assembly including a shaft plate, a stub shaft and a coupling plate, the shaft plate connected to the coupling plate, the shaft plate defining a shaft aperture therethrough with the stub shaft disposed in the shaft aperture, the stub shaft having a first end and an opposing second end defining a longitudinal axis, the first end depending from the shaft aperture and rotatably connected to the engine sheave, the coupling plate including a coupling rotatably connected to the interface, the coupling defining a coupling chamber therein, the second end of the stub shaft depending from the shaft aperture and connected in the coupling chamber such that a rotation of the coupling rotates the stub shaft to rotate the endless belt about the jackshaft and engine sheaves to operate the cutting apparatus.

16. The cutting machine as in claim 15, wherein the second end of the stub shaft defines an outer surface having a plurality of splines depending radially therefrom and disposed parallel to the longitudinal axis, and wherein the coupling chamber of the coupling defines an inner surface having a plurality of complementary splines depending inwardly therefrom and disposed parallel to the longitudinal axis, each of the complementary splines further disposed adjacent respective ones of the plurality of splines when the second end of the stub shaft is inserted in the coupling chamber of the coupling.

17. The cutting machine as in claim 15, wherein the stub shaft engaged in the coupling chamber is configured to fail prior to failure of a crankshaft of the engine.

18. The cutting machine as in claim 15, wherein the coupling engaged with the stub shaft is configured to fail prior to failure of crankshaft of the engine.

19. The cutting machine as in claim 15, further comprising a plurality of bushings disposed about the coupling engaged with the stub shaft, the bushings being configured to fail prior to failure of the stub shaft and the flywheel.

* * * * *